US005376768A

United States Patent [19]

Pasquini et al.

[11] Patent Number: 5,376,768

[45] Date of Patent: Dec. 27, 1994

[54] METHOD FOR EQUALIZING WEAR TO PROLONG THE LIFESPAN OF A PLASMA TORCH ELECTRODE

[75] Inventors: Pierre Pasquini, Fontainebleau; Jacques Nuns, Ecuelles, both of France

[73] Assignee: Electricite De France - Service National, Paris, France

[21] Appl. No.: 998,924

[22] Filed: Dec. 30, 1992

[30] Foreign Application Priority Data

Dec. 31, 1991 [FR] France .............................. 9116414

[51] Int. Cl.[5] .......................... B23K 10/00; B23K 9/06

[52] U.S. Cl. .......................... 219/121.57; 219/121.59; 219/121.54; 219/121.53; 219/123

[58] Field of Search ...................... 219/121.52, 121.54, 219/121.57, 123, 121.48, 74, 75, 121.59

[56] References Cited

U.S. PATENT DOCUMENTS 3,102,946 9/1963 Fonberg .......................... 219/121.54
4,535,225 8/1985 Wolf et al. .......................... 219/383

FOREIGN PATENT DOCUMENTS 0204052 11/1986 European Pat. Off. .
0277845 1/1988 European Pat. Off. .
966103 8/1964 United Kingdom .

*Primary Examiner*—Mark H. Paschall
*Attorney, Agent, or Firm*—Sughrue, Mion, Zinn, Macpeak & Seas

[57] ABSTRACT

The plasma torch (10; 11, 12, 14) comprises an electrical power supply (20) with an arc circuit (21) and a coil circuit (22) which are mounted in series and with means (30) for controlling the level of the current flowing in the coil (22) consisting, inter alia, mounted in parallel with this coil (14), of a chopper consisting of a battery of capacitors (31) and of at least one electronic power switch (32) which may be placed distant from the coil. The electronic switch is preferably of the thyristor diode (321, 322) type, with a resonant turn-off circuit (31, 323).

A variant of this chopper uses at least one electronic switch of the GTO thyristor type, controllable in triggering and in switching off, or at least one conventional thyristor equipped with an auxiliary extinction circuit.

Application to high-power torches, for industrial, for example metallurgical, use.

12 Claims, 5 Drawing Sheets

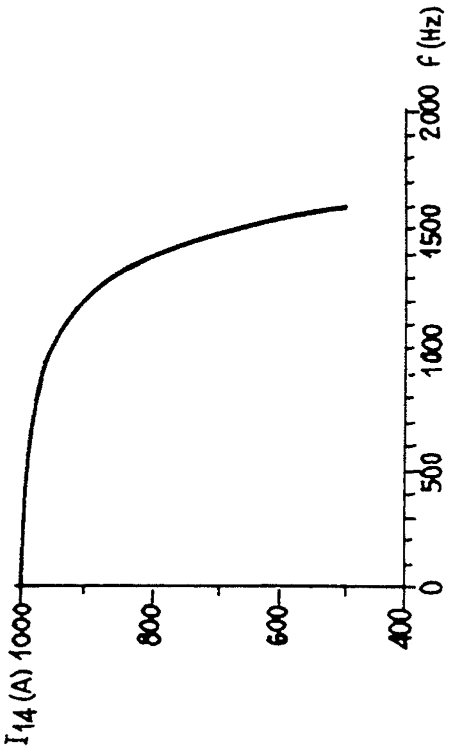
FIG.8
FIG.7
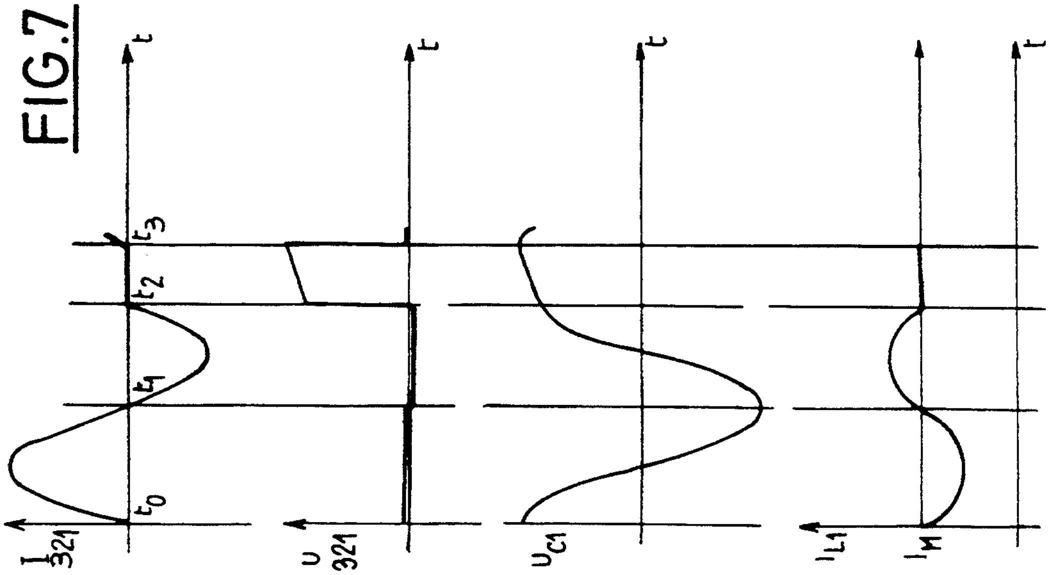

METHOD FOR EQUALIZING WEAR TO PROLONG THE LIFESPAN OF A PLASMA TORCH ELECTRODE

BACKGROUND OF THE INVENTION

The present invention relates to plasma torches and, more particularly, high-power plasma torches for which the life span of at least one of the electrodes is prolonged.

Plasma torches or arc plasma blowlamps are known in technology. This type of torch consists essentially of two tubular and coaxial electrodes, one upstream and one downstream as identified with respect to the direction of outflow of the plasma, which are separated by a chamber. An arc is established between the electrodes and, simultaneously, a plasma-generating gas is injected into the chamber which separates the electrodes. The arc which is struck between the electrodes is maintained and carries the gas at very high temperature and ionises it. At the outlet of one of the electrodes, the downstream electrode, this gas is driven at a high speed and the plasma which it constitutes forms the heat-carrying agent.

Certain types of plasma torch deliver powers lying between 100 and 500 kW and those to which the invention applies more particularly may produce several megawatts as is necessary for certain industrial, for example metallurgical, applications.

In this type of plasma torch, the electrodes are consumable components. The life span of the electrodes is a function of numerous parameters. Contributory factors are, for example, the power of the torch and, more particularly, the value of the arc current, the nature of the plasma-generating gas injected, since, due to its decomposition, reactions may take place with the constituent materials of the electrodes. The life span of the electrodes is, also, the function of the tasks performed by the torch, according to whether they are continuous or discontinuous.

The life span of the electrodes may vary from a few tens of hours for relatively low-power torches, to several hundreds of hours for those of high power to which the invention more particularly relates.

This relatively short life span of the electrodes is a significant drawback, particularly in an industrial context.

In order to attempt to remedy this drawback, it has been proposed to equip this type of torch with at least one magnetic field coil which locally surrounds preferably the upstream electrode, and to supply the latter with power with the aid of means which make it possible to control the displacement of the upstream foot of the arc on the upstream electrode in such a way as to make it describe an alternating longitudinal course, on which is superimposed preferably an oscillation or a vibration of the arc foot during the sweeping proper.

One solution of this type is, for example, disclosed by the document FR 2 609 358. According to the solution provided by this document, the field coil which locally surrounds the upstream electrode is supplied with power with the aid of a particular electrical circuit, which is specific to it and which is supplied with variable direct current whose level changes in steps or progressively and whose level furthermore preferably has a pulsating ripple whose frequency is significantly higher than that of the variation in the direct current on which it is superimposed. It can be imagined that the use of a special, independent, electrical power supply circuit for the field coil which is added to the main power supply circuit necessary for striking and maintaining the arc proper, technically complicates and financially increases the cost of the installation,

SUMMARY OF THE INVENTION

The object of the invention is to resolve this type of difficulty by making it possible for control of the displacement of at least one arc foot, especially the upstream arc foot, on an electrode, especially the upstream electrode, so as to equalise the wear thereof and to prolong the life span thereof, to be brought about without having any recourse to an independent, specialised circuit for the supply of power to at least one field coil which locally surrounds one of the electrodes, preferably the upstream electrode.

The subject of the invention is a method for equalising wear so as to prolong the life span of an electrode of a plasma torch, the torch consisting, inter alia, of two coaxial tubular electrodes between which an arc is established and which are separated by a chamber into which a plasma-generating gas is injected, of at least one magnetic field coil which locally surrounds an electrode, preferably the upstream electrode identified with respect to the direction of outflow of the plasma, of an electrical power supply for supplying energy to the arc and to the coil, and means for controlling the displacement of the foot of the arc on the electrode in such a way as to make it describe an alternating longitudinal course, vibratory if required. This method is characterised in that an electrical power supply is used with an arc circuit and a coil circuit, this arc circuit and this coil circuit are mounted in series, in parallel with this coil are mounted a chopper consisting of at least one capacitor connected to the terminals of the coil and of at least one electronic power switch, which may be placed distant from the coil.

The subject of the invention is also a plasma torch, especially for implementing the previously-indicated method, consisting, inter alia, of two coaxial tubular electrodes between which an arc is established, of a chamber which separates these electrodes and into which a plasma-generating gas is injected, of at least one magnetic field coil which locally surrounds an electrode, preferably the upstream electrode identified with respect to the direction of outflow of the plasma, of an electrical power supply for supplying energy to the arc and to the coil, and means for controlling the displacement of the foot of the arc on the electrode, preferably the upstream foot on the upstream electrode, in such a way as to make it describe an alternating longitudinal course, vibratory if required, in order to equalise the wear thereof and to prolong the life span thereof. This plasma torch is noteworthy in that the electrical power supply comprises an arc circuit and a coil circuit, in that this arc circuit and this coil circuit are mounted in series, in that these means comprise, mounted in parallel with the coil, at least one chopper consisting of at least one capacitor [lacuna] to the terminals of the coil and of at least one electronic power switch which may be placed distant from the coil.

Other characteristics of the invention will emerge on reading the description and the claims which follow, as well as from examination of the attached drawing, given solely by way of example, in which:

BRIEF DESCRIPTION OF THE DRAWING

FIG. 7 illustrates the variation in current level and in voltage in certain components in the course of operation;

FIG. 8 illustrates the variation in the current level in the coil as a function of the operating frequency of the chopper and FIG. 9 illustrates a variant embodiment of an installation according to the invention.

DESCRIPTION OF PREFERRED EMBODIMENTS

The plasma torches and the electrical installations intended for supplying them with power being well known in technology, only matters directly or indirectly relating to the invention will be described in what follows. For the remainder, the person skilled in the art will draw on current conventional solutions available to him in order to address particular problems with which he is confronted.

In what follows, the same reference number always identifies a corresponding element, whatever the embodiment or its variant.

For the convenience of the narrative, each of the component parts of the invention will be described successively, before setting out the operation and the construction thereof, if appropriate.

Figure 1:
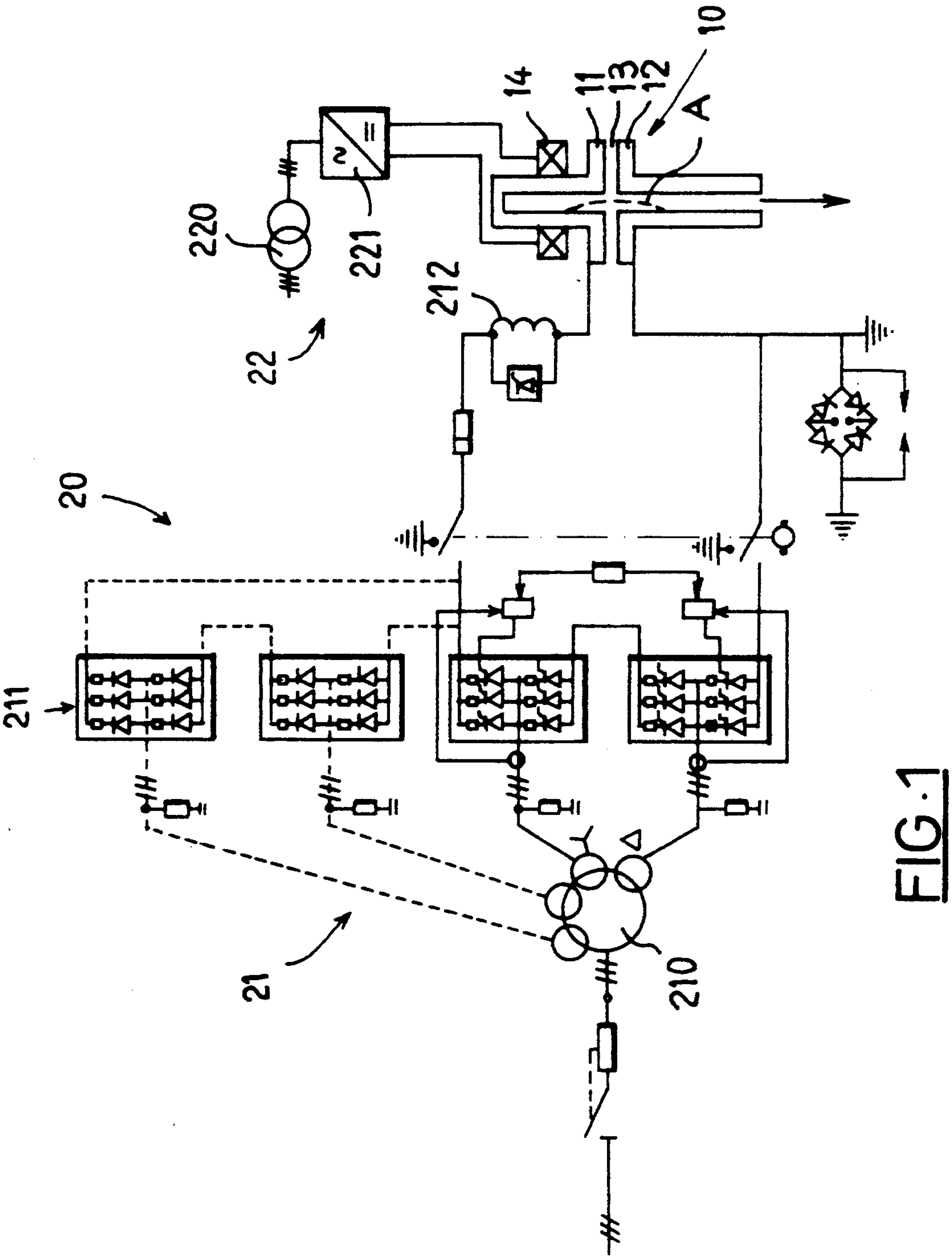
FIG. 1 is a general, simplified diagrammatic view of the electrical installation of a plasma torch according to the prior art of the quoted document.

As is represented diagrammatically in FIG. 1, a plasma torch of the type to which the invention applies, designated overall by the reference 10, comprises two coaxial tubular electrodes 11 and 12 between which an arc A is established and maintained. A chamber 13 separates the electrodes 11 and 12 and it is into the latter that a plasma-generating gas is injected. At least one magnetic field coil 14 locally surrounds at least one of the electrodes, preferably the upstream electrode 11 identified with respect to the direction of outflow of the plasma, as illustrated by an arrow.

An electrical power supply 20 supplies electrical energy to the arc and to the coil.

According to the prior art, for example that set out in the abovementioned document, this electrical installation 20 comprises two separate independent circuits: the circuit 21 intended more particularly for supplying the arc and which may be described as main power circuit, and a circuit 22 intended more particularly for supplying the coil and which may be described, for example, as auxiliary circuit.

As can be seen, the arc circuit 21 comprises, inter alia, a transformer 210 of 2.5 MVA, for example, with four secondaries which are each equipped with a specific three-phase rectifier 211, of the Graetz thyristor bridge type, for example. Two of these secondaries are, for example, star connected, and two others delta connected. This circuit still comprises a smoothing inductor 212. This circuit also comprises, as is usual, protection devices, isolating switches and circuit breakers whose role is conventional and which will not be dwelt on.

The coil circuit 22 comprises, inter alia, a specific transformer 220 of 100 kVA installed [sic], for example, and its own rectifier 221, for example a three or six-phase Graetz bridge with thyristors and diodes and a smoothing inductor, if required.

According to the prior art it is this specific circuit 22 which delivers the current level, at the datum value, which supplies the coil 14 in order to control the displacement of the upstream arc foot.

Figure 2:
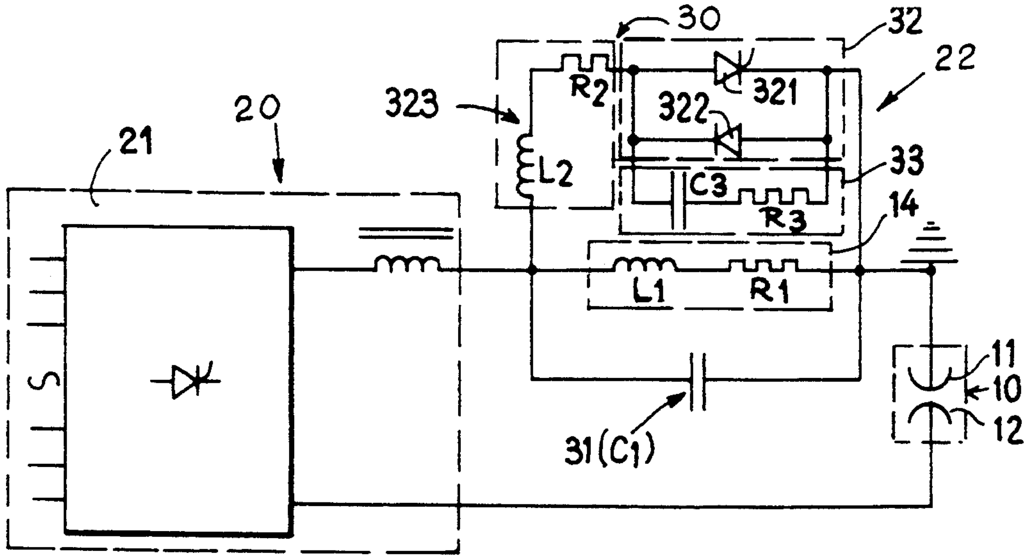
FIG. 2 is a partial, diagrammatic view of an embodiment of an installation according to the invention.

As can be seen in FIG. 2, according to the invention, the electrical power supply 20 now comprises an arc circuit 21 and a coil circuit 22 which are mounted in series, that is to say which are no longer either separate or independent.

According to the invention, the means 30 for controlling the displacement of the foot of the arc on the electrode in such a way as to make it describe an alternating longitudinal course, vibratory if required, so as to equalise the wear thereof and prolong the life span thereof, comprise, mounted in parallel with the coil 14, at least one chopper consisting of at least one capacitor 31 and of at least one electronic switch 32 which, it should be noted, is placed physically distant from the coil for reasons which will appear later. As can be seen in FIG. 2, according to the invention, such a chopper 32 comprises at least one switch formed by a main thyristor 321 and by a recuperation diode 322.

This chopper 32 comprises at least one switch formed by a main thyristor 321, by a recuperation diode 322 and by a turn-off circuit for the main thyristor with a resonant mounting. This resonant mounting has an operating limit frequency which is determined by the capacity of the capacitor 31 and the impedance, particularly the inductance, of the linking cables 323 connecting the coil 14 to the electronic switches when the chopper is operating.

If appropriate, a commutation assisting circuit 33 is mounted in parallel with the switch formed by the main thyristor 321 and by the recuperation diode 322. This circuit 33 preferably comprises a resistor $R_3$ and a capacitor $C_3$ in series.

Figure 9:
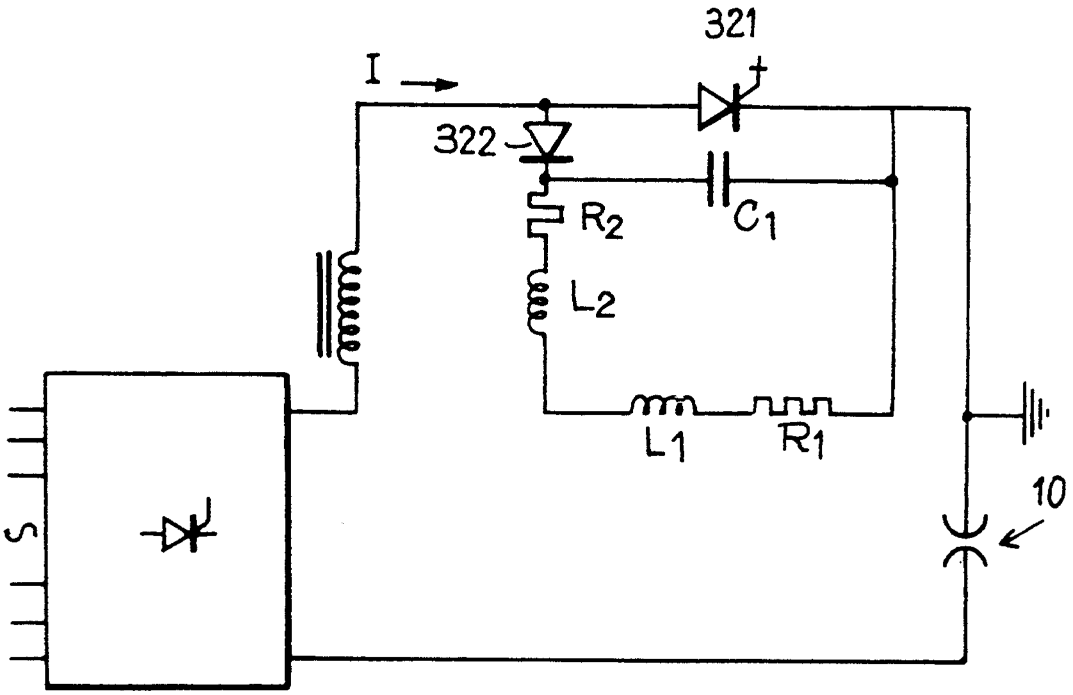

According to an embodiment variant illustrated in FIG. 9, the chopper may consist of a battery of capacitors 31, of at least one GTO (Gate Turn off) thyristor 321 controllable in triggering and in turning off, and of at least one diode 322. The whole of the chopper may, in this case, be distant from the coil. In this variant, the GTO thyristor may be replaced by a conventional thyristor equipped with an auxiliary extinction circuit.

The power supply for the arc with four secondaries, two in series and two in parallel, makes it possible, according to the connections adopted, to deliver 500, 1000 or 2000 A at 4000, 2000 or 1000 V. It will be noted, however, that in normal operating conditions, in particular for industrial installations, the arc is supplied with a current at a level of about 1000 A and that, by virtue of the invention, it is possible to divert an adjustable part of this current into the coil in such a way as to be able to control the displacements of the arc foot especially of the upstream arc foot.

For reasons which will be understood later, the choice of the transformer, of the rectifier and of the smoothing inductor makes it possible to obtain a direct current with a residual ripple at a frequency which is a multiple of that of the mains. In certain cases, advantage is taken of this residual ripple in order to make the arc foot vibrate about itself during its longitudinal alternating sweeping of the electrode.

By virtue of the invention, the solution adopted makes it possible to keep the chopper 32 physically far from the coil 14 which makes it possible to get round difficulties which would otherwise stem from the impedance, and in particular from the distributed inductance of the linking cables 323 which generates significant awkward overvoltages on commutation. According to the solution of the invention, this inductance is put to good use and it is this distributed inductance of the linking cables which is used to constitute a resonant mounting serving for control of the switch.

The operation of the installation according to the invention will now be described in its various phases.

In what follows, the following designations are used:

$L_1$ and $R_1$ are the inductance and the resistance, respectively, of the coil 14

$C_1$ is the capacitance of the capacitor 31

$L_2$ and $R_2$ are the inductance and the resistance, respectively, of the linking cables 323.

Initially, it will be assumed that the power supply is delivering a current I of constant level and that the presence of the commutation assisting circuit 33, which will be revisited later, may be ignored. The initial state of the installation then corresponds to that which is shown diagrammatically in FIG. 3. The current I being established in the coil 14, the voltage at its terminals is that $U_{c1}$ of the capacitor 31 and the voltage at the terminals of the thyristor 321 is positive. The relation exists: $U_{c1}=R_1$. At the instant $t=t_0$, the thyristor is triggered and the latter becomes conducting for the duration $t_0$ to $t_1$. The state of the installation is then that which is shown diagrammatically in FIG. 4.

Figure 5:
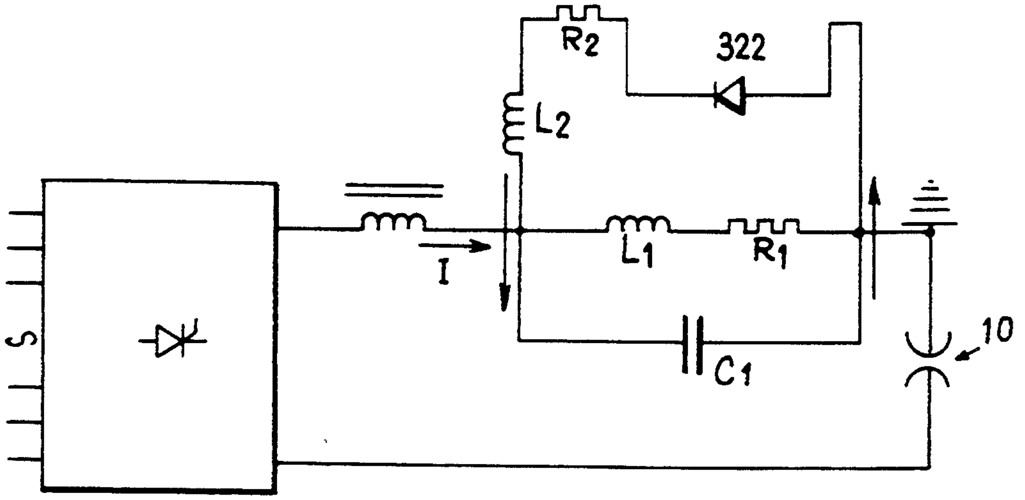

The capacitor 31 starts oscillating by reason of the essentially inductive $L_2$ and resistive $R_2$ distributed impedance of the linking cables 323. The capacitor and the cables used are thus equivalent to a series RLC circuit in which the voltage and the level of the current $U_{c1}$ and $i_{L1}$ have damped sinusoidal variations. The current in the coil reduces slowly since the distributed impedance of the linking cables is lower than that of the coil. The thyristor 321 therefore passes a sinusoidal current on which the value of the current diverted from the coil is superimposed. This phase is completed when the current in the thyristor cancels out at the instant $t=t_1$, an instant at which the voltage at the terminals of the capacitor is negative and maximum. The thyristor turns off "naturally ". The state of the installation then becomes that which is shown diagrammatically in FIG. 5.

Figure 6:
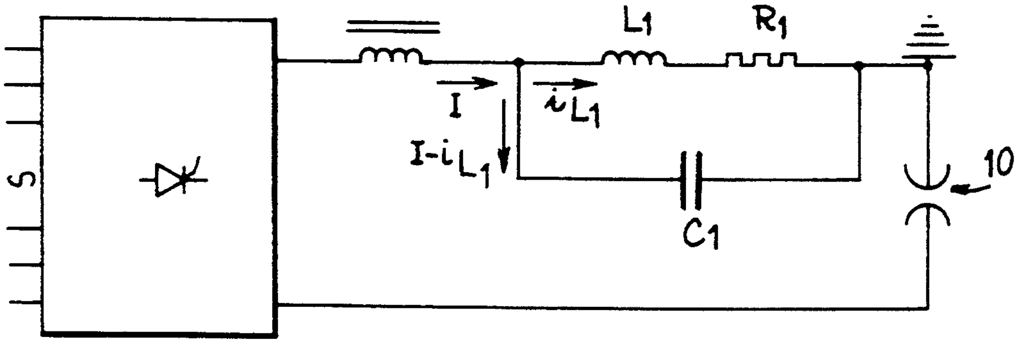

During the phase which runs from the instant $t_1$ to the instant $t_2$ diode 322 is conducting. The oscillating circuit $R_2C_1L_2$ consisting of the capacitor and the linking cables carries out a second half-oscillation in order to attempt to return to the initial voltage $u_{c1}$ and current level $i_{L1}$ conditions with quasi-sinusoidal variations. The difference between the level I of the current delivered by the installation and that $i_{L1}$ of the current which is flowing in the coil is added to the level $i_{L2}$ of the current in the linking cables. When this current $i_{L2}$ again passes through 0 at the instant $t=t_2$, the voltage $u_{c1}$ at the terminals of the capacitor regains a positive and maximum value, but slightly lower than its initial value $R_1I$ by reason of the damping resulting from the resistance $R_2$ of the linking cables. The diode 322 turns off. The state of the installation then becomes that which is shown diagrammatically in FIG. 6.

Figure 3:
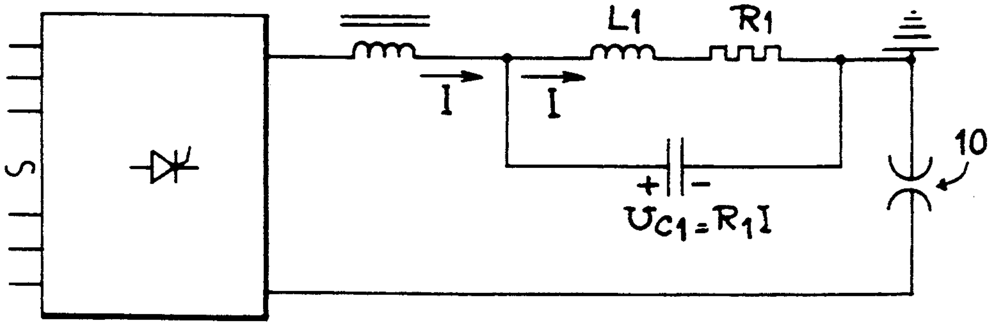
FIGS. 3, 4, 5 and 6 are views similar to that of FIG. 2 illustrating the behaviour and the state of the installation in various phases of its operation in order to facilitate understanding thereof.
Figure 4:
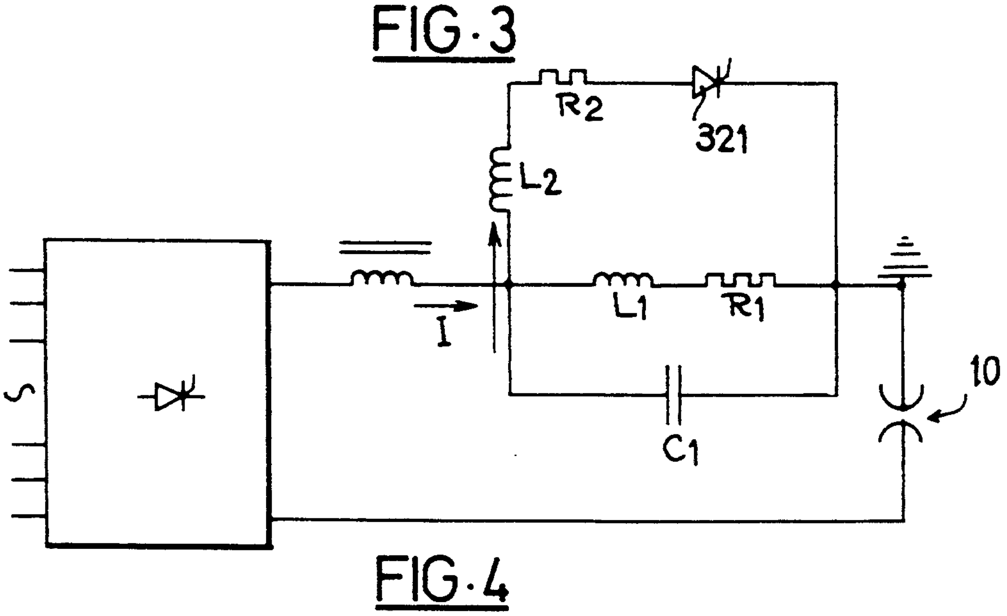

During the duration which runs from the instant $t_2$ to the instant $t_3$, the capacitor charges and a situation arises which is similar to that of the initial situation illustrated in FIG. 3, noting, however, that the level $i_{L1}$ of the current which is flowing in the coil is no longer the level I of the current delivered by the installation. In principle, the charge from the capacitor $C_1$ is a damped sinusoidal charge which should make it possible to recover the situation $i_{L1}=I$ and $U_{c1}=R_1I$. However, according to the invention, at this moment, the thyristor 321 [lacuna] chopper 32 is turned on sufficiently early that the current $i_{L1}$ can be regarded as remaining practically unchanged; the capacitor $C_1$ therefore charges with a current level of $I-i_{L1}$ which can be considered to be constant.

At the instant $t=t_3$ the thyristor 321 is retriggered in order to describe a new operating cycle.

Hence it is seen that it is thus possible to progressively reduce the level of the current from the coil 14 by modifying the control frequency of the thyristor 321 of the chopper 32.

For a given frequency, the instantaneous current level $i_{L1}$ in the coil stabilises around one value while oscillating at the control frequency of the thyristor. It will be observed that the amplitude of this oscillation is small compared to the value of the level of total current flowing in the coil. In steady-state regime, it is thus possible to resume the same sequences of the operating process by considering the level $I_{L1}$ of the current in the coil to be constant. In this situation, there is a sinusoidal variation of the level of the thyristor (321)-diode (322) current during the duration $t_0$ to $t_2$ with a superimposed direct current component equal to $I-I_{L1}$, and there is a linear increase in the voltage $u_{c1}$ at the terminals of the capacitor during the duration which goes from the instant $t_2$ to the instant $t_3$ by reason of the charging of this capacitor by the current at a level of $I-I_{L1}$.

It will be observed that, in the case of extinction of the arc, the current in the coil may be dissipated in the diode 322 of the switch of the chopper until extinction.

It will also be observed that the resonant frequency $f_0$ which is determined by the capacitance $C_1$ of the capacitor 31 and the inductance $L_2$ of the linking cables 323 fixes a value which should not exceed the control frequency f of the thyristor 321. In fact, if control of the switch is effected at a frequency f which is greater than the previously-indicated limit frequency $f_0$, this thyristor would remain permanently conducting, and in order to be able to turn off this thyristor and return to normal operation of the chopper it would then be necessary to remove the source of current. In practice, this frequency f is not the real limit value which should not be exceeded. In fact, in order not to have unintentional retriggering of the thyristor, it is necessary to observe certain conditions, inter alia the necessity of applying, to its terminals, a negative voltage for a sufficient duration, at least equal to the turn-off duration $t_q$ of the switch; however this duration is a function of the level of the diverted current, since this current is superimposed on the sinusoidal ripple and also on [sic] the damping of the circuit. There therefore exists a limit frequency which physically is lower than the value of the theoretical limit frequency $f_0$.

The explanation above shows that the electrical installation according to the invention operates according to two different successive regimes, one taking place during the operation of the chopper and the other taking place as if the latter did not exist.

For the first regime for which the chopper is in operation, conventional mathematical developments of the equations governing circuits show that the only important significant parameters are the capacitance $C_1$ of the capacitor 31, the resistance $R_1$ and the inductance $L_1$ of the coil 14 as well as the resistance $R_2$ and the inductance $L_2$ of the linking cables 323, and also show that only the initial conditions of the regime are of importance. It is thus possible to deduce the level $i_{L2}$ of the current in the switch and the voltage $U_{c1}$ at the terminals of the capacitor. This regime is that which prevails from the instant $t_0$ to the instant $t_2$ at which the switch turns off. This stop at the instant $t_2$ is produced when the current level $i_{L2}$ in the linking cables cancels out with a positive slope. At this instant $t_2$ the voltage $U_{c1}(t_2)$ at the terminals of the capacitor and the level $i_{L1}(t_2)$ of the current in the coil are then known.

For the second regime, conventional mathematical developments then show that as the chopper is stopped, the situation is that of a series LRC oscillating circuit whose parameters are the capacitance $C_1$ of the capacitor 31 and the resistance $R_1$ and the inductance $L_1$ of the coil 14. This regime terminates at the instant $t_3$ equal to the inverse of the control frequency of the thyristor. 0n restarting the installation, corresponding to the first regime indicated above, the initial conditions are those of the level $i_{L3}$ ($t_3$) of the current flowing in the coil 14 and the voltage $u_{c1}$ ($t_3$) at the terminals of the capacitor 31.

It is then sufficient to proceed by iteration to the stabilisation of the current in the coil for a given control frequency.

The above has been used with a 2 MW plasma torch whose power supply was provided by means of linking cables whose inductance was of the order of 20 μH and using a capacitor of capacitance 400 μF. For such an embodiment, the characteristic operating frequency of the chopper was 1780 Hz. The resistance and inductance of the coil were of the order of 70 mΩ and 4 mH respectively. As the chopper formed by a diode and by a thyristor has to withstand current peaks whose level may reach about 3000 A at voltages of the order of 500 V, several switches according to the invention were used, mounted in parallel in order to take account of the capabilities of the commercial components. For practical construction, thyristor diodes bearing the reference CSR 447 in the catalogue of the BROWN-BOVERI company were used.

When several switches of the thyristor diode type are mounted in parallel, as indicated above, it is necessary to arrange that one two [sic] does not turn on more quickly than another, failing which, the one which is turned on first will have all of the current pass through it and will therefore be destroyed. In order to avoid this drawback, a turn-on regulator circuit is placed in series with each thyristor, which circuit is formed by a small inductor or self inductance tasked with slowing down and distributing the rise in current in this thyristor, independently of the other switches. In this way, the leading edges of the current level are controlled at turn-on and it is possible to avoid the drawbacks resulting from asymmetries. For the preceding practical embodiment, self inductances were used whose inductance lay between 5 and 15 μH.

In order to avoid the parasyitic effects which are produced on turning on the thyristors of the switches, it is necessary to control the edge of the rise in current level so as to have an evenly-distributed conduction; similarly, it is necessary to control the turning-off of the diodes which result [sic] from the rise in the voltage at the terminals of the capacitor. In order to do that, a commutation assisting or protection circuit 33 is used, placed in parallel with the switch of the chopper 32, as emerges from the diagram of FIG. 2. This circuit 33 is preferably of the RC type with a resistor $R_3$ and a capacitor $C_3$ in series. For example, resistors $R_3$ whose value lies between about 5 and 10 Ω and capacitors $C_3$ whose capacitance lies between 0.2 μF and 1.7 μF have been used.

In order to obtain good triggering of the thyristors 321, it is necessary to control the gate current of the latter correctly. It is necessary, in the first instance, for the gate to be subjected to a fast-rising current level peak then, next, for the level of this current to be held at a lower value. The mountings which make it possible to obtain such control are known in technology, which is why this point will not be laboured. With the practical embodiment adopted, the gate current level has reached a value of 3.5 A with a rise on starting of about 2.5 A/μs and has then been stabilised at about 0.6 A until the end of the control signal.

The value of the level in the coil is compared to a datum value with the aid of a known conventional regulation circuit, for example a closed-looped circuit with feedback. One type of solution is provided, for example, in the abovementioned document.

From the above, all the advantages which result from the invention may be understood, since the power supply to the coil which makes it possible to control the displacement of the foot of the arc on the electrode no longer requires the use of an independent circuit with its own power supply.

What is claimed is:

1. Method for equalising wear so as to prolong the life span of an electrode of a plasma torch, the torch consisting, inter alia, of two coaxial tubular electrodes between which an arc is established and which are separated by a chamber into which a plasma-generating gas is injected, of at least one magnetic field coil which locally surrounds an electrode, preferably the upstream electrode identified with respect to the direction of outflow of the plasma, of an electrical power supply for supplying energy to the arc and to the coil, and means for controlling the displacement of the foot of the arc on the electrode in such a way as to make it describe an alternating longitudinal course, characterised in that an electrical power supply is used with an arc circuit and a coil circuit, this arc circuit and this coil circuit are mounted in series, in parallel with this coil are mounted a capacitor and at least one chopper consisting of at least one capacitor and of at least one electronic power switch, which may be placed distant from the coil.

2. Method according to claim 1, characterised in that thyristors and diodes with a resonant mounting are used as the switches.

3. Plasma torch (10), consisting, inter alia, of two coaxial tubular electrodes (11, 12) between which an arc is established, of a chamber (13) which separates these electrodes (11, 12) and into which a plasma-generating gas is injected, of at least one magnetic field coil (14) which locally surrounds an electrode, preferably the upstream electrode (11) identified with respect to the direction of outflow of the plasma, of an electrical power supply (20) for supplying energy to the arc and to the coil, and means (30) for controlling the displacement of the foot of the arc on the electrode in such a way as to make it describe an alternating longitudinal course, vibratory if required, in order to equalise the wear thereof and to prolong the life span thereof, characterised in that the electrical power supply (20) comprises an arc circuit (21) and a coil circuit (22), in that this arc circuit (21) and this coil circuit (22) are mounted in series, in that these means (30) comprise, mounted in parallel with the coil (14), at least one chopper consisting of at least one capacitor (31) and of at least one electronic power switch (32) placed distant from the coil.

4. Torch according to claim 3, characterised in that the chopper (32) comprises at least one switch formed by a main thyristor (321), by a recuperation diode (322) and by a turn-off circuit for the main thyristor (321).

5. Torch according to claim 3, characterised in that the chopper (32) comprises at least one switch formed by a main thyristor (321), by a recuperation diode (322) and by a turn-off circuit for the main thyristor (321) with a resonant mounting.

6. Torch according to claim 3, characterised in that it comprises a chopper consisting of a battery of capacitors (31) and of several thyristor diode (32) assemblies mounted in parallel.

7. Torch according to claims 5, characterised in that it comprises a commutation assisting circuit (33) mounted in parallel with the switch formed by the main thyristor (321) and by the recuperation diode (322).

8. Torch according to claim 7, characterised in that the resonant mounting has an operating limit frequency determined by the capacitance ($C_1$) of the capacitor (31) and the impedance ($R_2$, $L_2$) of the linking cables (323) connecting the coil (14) to the electrical power supply (20), when the chopper is operating.

9. Torch according to claim 8, characterised in that the commutation assisting circuit (33) comprises a resistor ($R_3$), in series with a capacitor ($C_3$).

10. Torch according to claim 9, characterised in that it comprises a turn-on regulator circuit.

11. Torch according to claim 10, characterised in that the turn-on regulator circuit comprises a small inductor mounted in series with each thyristor (321) of a chopper (32).

12. Torch according to claim 3, characterised in that the chopper (32) comprises at least one GTO (Gate Turn Off) thyristor controllable in triggering and in turning off.

* * * * *